April 14, 1959 W. D. WHITE 2,882,395
ELECTRONIC CIRCUITS
Filed Jan. 21, 1958 3 Sheets-Sheet 1

INVENTOR
Warren D. White
ATTORNEYS

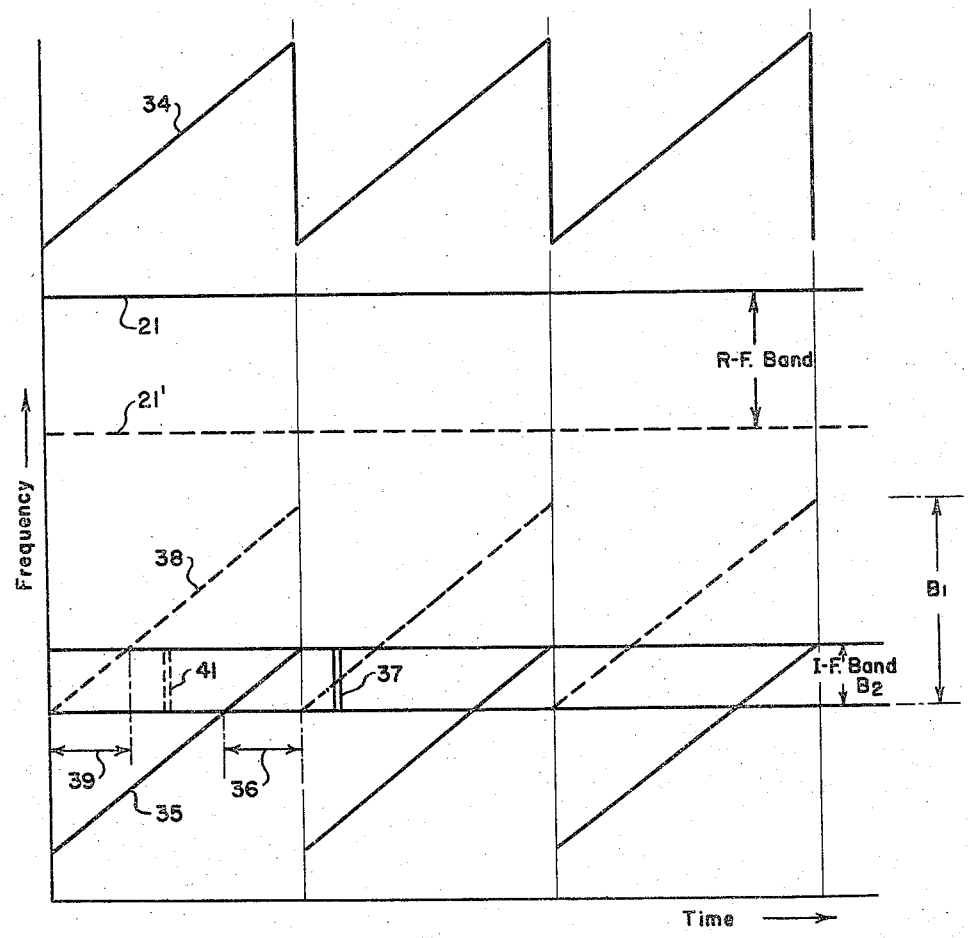

INVENTOR
Warren D. White
BY
ATTORNEYS

United States Patent Office 2,882,395
Patented Apr. 14, 1959

2,882,395
ELECTRONIC CIRCUITS

Warren D. White, East Norwich, N.Y., assignor, by mesne assignments, to Cutler-Hammer, Inc., Milwaukee, Wis., a corporation of Delaware Application January 21, 1958, Serial No. 710,210

11 Claims. (Cl. 250—20)

This invention relates to improvements in sweep-frequency heretodyne circuits. It is especially directed to radio intercept receivers of the panoramic type, but is also applicable to devices such as audio spectrum analyzers, noise analyzers, etc.

Panoramic intercept receivers of the superheterodyne type are now well known. In such receivers the local oscillator is repeatedly swept over a selected frequency range so as to convert received radio frequency (R-F) signals lying within a selected R-F frequency band to a selected intermediate frequency in succession. The intermediate frequency is then detected and the resulting output displayed in a desired manner. One type of display employs a cathode-ray tube with a horizontal time sweep synchronized with the local oscillator sweep and the received signals deflect the cathode-ray beam in the vertical direction. Due to the synchronization, the horizontal time scale may be considered a frequency scale and received signals in different portions of the R-F swept band are displayed at different points along the horizontal trace.

Three basic, interrelated factors are inherent in present conventional panoramic receivers. They are the swept bandwidth, the sweep repetition frequency and the resolution.

Ordinarily it is desirable to sweep through as wide an R-F band as possible, in order to cover all radio frequencies of interest with a minimum number of receivers. It is also desirable to make the sweep repetition frequency as high as possible so as not to miss brief transmissions, and also to secure more information concerning repetitive transmissions.

A high resolution is usually important. This factor determines how close in frequency two signals can be, and still be identified as separate signals. It also determines how faithfully received pulses can be displayed. The resolution of conventional panoramic receivers is limited primarily by the bandwidth of the intermediate-frequency channel (I-F bandwidth). This assumes adequate care in designing other portions of the receiver so that the I-F channel is the primary factor in determining receiver selectivity.

The three factors are related in the following manner in the conventional receiver. The R-F swept bandwidth and the sweep repetition frequency largely determine the sweep rate, which is the number of cycles per second swept in a given unit of time. For many applications it is convenient to express the sweep rate in megacycles per second swept in a microsecond. Assuming that a continuous wave (CW) signal is being received, for a given I-F bandwidth the signal lies within the I-F band for only a short interval of time determined by the sweep rate and the I-F bandwidth. Thus, only a short pulse passes through the I-F channel for a given signal. For example, with a 100 megacycle swept band and a 10 kilocycle sweep repetition frequency the sweep rate is one megacycle per microsecond. If the I-F bandwidth is one megacycle, a received CW signal will lie within the I-F acceptance band for one microsecond. Consequently, a one microsecond pulse of I-F energy will pass through the I-F channel.

Frequency and bandwidth are properly specified as cycles (kilocycles, megacycles) per second, but it is common practice to omit "per second." This practice will be followed herein, except when clarity requires otherwise.

As is well known in the art, the minimum time duration (length) of a pulse at the output of an amplifying channel is determined largely by the bandwidth of the channel. The shorter the pulse, the wider the channel must be for proper reproduction. This is because pulses have a frequency spectrum determined by the pulse length and shape, and the width of the frequency spectrum increases as the pulses become shorter. For adequate reproduction, the amplifier must pass the major components in the pulse frequency spectrum. The relationship usually accepted is that the product of the bandwidth and the minimum output pulse length is unity. Accordingly, with an I-F channel of one megacycle bandwidth supplied with input pulses of various lengths, the shortest output pulses will be of approximately one microsecond duration. With a 10 megacycle channel, output pulses of approximately 0.1 microsecond duration can be obtained.

If pulses longer than one microsecond are supplied to a channel of one megacycle bandwidth, the output pulses will be longer than one microsecond. On the other hand, if pulses shorter than one microsecond are applied to the same channel, the output pulses will not be shorter but will be approximately one microsecond long. Thus, when viewed on the display, the narrowest pulses observable will be one microsecond in length, and this imposes a limit on the resolution of the receiver.

It should be noted that narrowing the I-F band to improve selectivity does not necessarily improve resolution. The latter depends upon the relationship between the I-F bandwidth and the sweep rate. If the sweep rate is low for a given I-F bandwidth, say 100 kilocycles/sec. per microsecond for a one megacycle I-F bandwidth, then reducing the I-F bandwidth will increase the resolution. However, if the sweep rate is one megacycle/sec. per microsecond, reducing the I-F bandwidth below one megacycle will reduce the resolution since, although the pulses produced by the sweep action will then be less than one microsecond, they will be reproduced at the output of the I-F amplifier as longer pulses corresponding to the I-F bandwidth, approximately 10 microsecond pulses for a 100 kilocycle bandwidth.

It will therefore be seen that the maximum resolution of a conventional panoramic receiver is limited by the I-F bandwidth and sweep rate, and any improvement in resolution can be obtained only at the expense of a lower sweep rate, and vice versa. Such a lower sweep rate requires reducing the swept band or the sweep repetition frequency.

It is a primary object of the present invention to provide a panoramic receiver in which the sweep rate can be greatly increased while still preserving the same resolution, or, conversely, to permit the resolution to be increased while preserving the same sweep rate. Although especially adapted and useful in panoramic receivers of the type described above, the invention can also be applied to other devices such as audio spectrum analyzers, noise analyzers, etc.

Another factor which is important in panoramic receivers is the noise bandwidth. The sensitivity of a radio receiver is eventually limited by the amount of noise present in its output. This noise may originate externally or internally. In a conventional panoramic receiver of the type described above, narrowing the I-F band will reduce the amount of noise in the output, other factors remaining the same. If the I-F band is widened, a greater amount of noise is present in the output and hence the ultimate sensitivity is reduced. In accordance with the present invention, the I-F band may be widened to obtain increased resolution, while at the same time narrowing the noise bandwidth, hence increasing the sensitivity of the receiver.

In accordance with the invention a dispersive network is incorporated in the I-F channel so as to convert pulses generated by the sweep action to much shorter pulses which are reproduced by the display device. Thus, the resolution is improved, other factors remaining the same. Since the noise bandwidth is the same as the resolution bandwidth, this increase in resolution will be accompanied by a decrease in noise bandwidth and consequent increase in sensitivity. The circuits following the dispersive network should have sufficient bandwidth to reproduce adequately the narrow pulses produced by the dispersive network.

Dispersive networks are known in the art and in general have the characteristic that the delay time varies with frequency. Thus, if an input signal is applied thereto which varies in frequency, the lower frequencies will be delayed more than the higher frequencies, or vice versa. In the present application, due to the sweeping action, a frequency varying pulse is produced at the input of the dispersive network whose upper and lower frequency limits are determined by the I-F bandwidth and whose duration is determined by the I-F bandwidth and the sweep rate. The lower frequencies in the pulse are delayed more than the higher frequencies, or vice versa depending on the direction of sweep, and consequently the output of the dispersive network is a pulse of much shorter duration than that existing at the input.

The invention will be more fully understood from the following detailed description thereof, taken in conjunction with the drawings, in which:

Fig. 3 illustrates one form of display;

Fig. 4 is a graph presentation for explaining the operation of a receiver in accordance with the invention;

Figure 1:
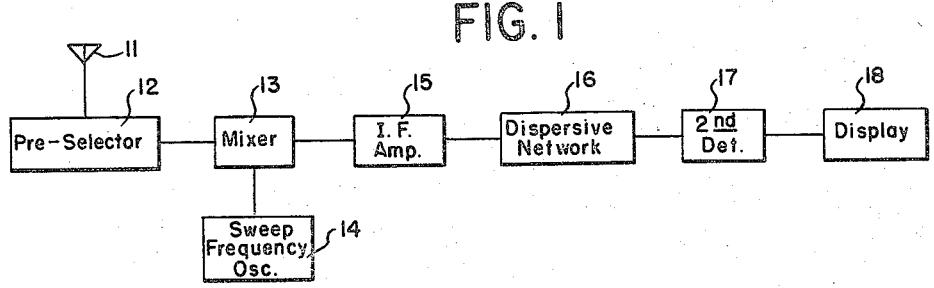
Fig. 1 is a block diagram of a panoramic receiver of the invention.

Referring now to Fig. 1, a panoramic receiver is shown in which signals picked up by an antenna 11 are supplied to an input circuit here shown as a preselector 12, and thence to a heterodyne mixer 13. The output of a sweep-frequency oscillator 14 is also supplied to mixer 13. The preselector 12 may take any desired form and is here assumed to be a broadly tuned circuit passing the entire R-F band to be swept. The sweep-frequency oscillator 14 generates an oscillation whose frequency varies over a selected range. Advantageously the variation is linear with time, followed by a quick return to the initial frequency in sawtooth form.

The heterodyne beat frequency between the local oscillation and the incoming R-F signal is developed in mixer 13 and fed to the I-F amplifier 15. The output of the I-F amplifier is then supplied to a dispersive network 16 which delays low frequencies a greater length of time than high frequencies, or vice versa depending on whether the sweep in the I-F amplifier is from low to high frequencies or from high to low. The output of the dispersive network is supplied to the second detector 17 and thence to a display device 18. The display device may take any desired form, and commonly displays separately the detected signals corresponding to R-F input signals of different frequency.

Figure 2:
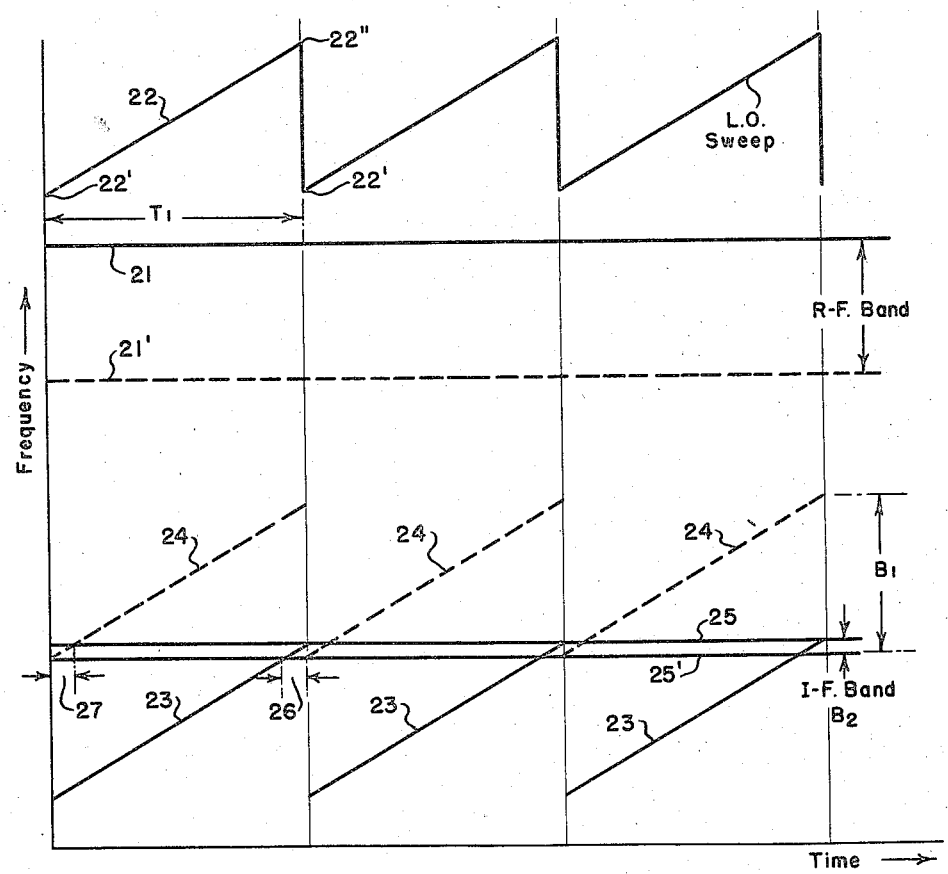
Fig. 2 is a graph presentation for explaining the operation of a conventional panoramic receiver.

Referring now to Fig. 2, the R-F band to be swept is between lines 21 and 21'. The local oscillator sweep frequency is shown at 22 and progresses linearly from a lower frequency limit 22' to a higher frequency limit 22" and then returns abruptly to its lower limit, ready for the next sweep. The sawtooth wave has a selected sweep repetition frequency which will be denoted $f_1$ herein. The corresponding sweep repetition period will be termed $T_1$ and is shown in Fig. 2.

The local oscillator may be designed to track above or below the R-F band, as is well understood, and is here shown tracking above. In the mixer 13, the local oscillation is heterodyned with an incoming signal to produce a beat frequency which is the sum or difference of the two frequencies. The difference beat frequency is commonly employed in panoramic receivers, as here shown, but in some applications of the invention the use of the sum frequency may be preferable. For any given input signal frequency within the range for which the receiver is designed, a corresponding sweep beat frequency will be produced.

The sweep beat frequency between the local oscillation and the highest frequency 21 in the R-F band is shown by full lines 23. Similarly, the beat frequency between the local oscillation and the lowest R-F frequency 21' is shown by dotted lines 24.

In conventional panoramic receivers the bandwidth of the I-F amplifier is commonly much narrower than the swept R-F band. In Fig. 2 the I-F channel is represented by lines 25, 25', and the corresponding bandwidth is denoted $B_2$.

As is apparent from the diagram, the beat frequency 23 corresponding to the highest R-F frequency will lie within the I-F pass band $B_2$ for only a short time, thereby producing a pulse whose duration or length is shown at 26. Similarly, the beat frequency 24 corresponding to the lowest R-F frequency will lie within the I-F band for only a short time, producing a pulse of similar length, shown at 27. The same will be true of any other frequency within the R-F band since the beat frequencies corresponding to other R-F signals will lie somewhere between lines 23 and 24.

Commonly the frequency range over which the local oscillator sweeps is approximately equal to the swept R-F band plus the I-F bandwidth, as shown. However, it is possible to insert suitable filters in the preselector 12 (Fig. 1) so as to reduce the R-F bandwidth. In either event, the slope of lines 23, 24, represents the sweep rate $f$, and is equal to the sweep range of the local oscillator divided by the sweep repetition period $T_1$ for a linear sweep. Thus the pulse durations 26, 27, etc. are equal to the I-F bandwidth divided by the sweep rate.

In the conventional panoramic receiver, without the dispersive network 16, a pulse corresponding to a given R-F signal will be detected in the second detector 17 and displayed as a pulse. Fig. 3 shows a simple display often used in panoramic receivers. Here line 30 represents the horizontal trace on the face of a cathode-ray tube and the cathode-ray beam is deflected linearly with time, and synchronously with the local oscillator sweep. Consequently, intervals along line 30, although fundamentally units of time, also represent units of frequency. The detected signal corresponding to the pulse produced during interval 26 for a high frequency R-F signal will appear on the display somewhat as shown at 31. Similarly, a pulse corresponding to interval 27 for a low frequency R-F signal will appear on the display at 32. The actual shape of the pulses on the display tube will ordinarily be somewhat rounded and perhaps somewhat irregular, depending upon the receiver characteristics, so that no attempt is made here to reproduce exact shapes.

The width of the pulses 31, 32 is important to the resolution of the receiver. Thus an adjacent pulse 33 cannot be readily discerned as a separate transmission if it overlaps pulse 32 too much. The narrower the pulses, the more readily adjacent pulses can be identified. The width of the observed pulses is determined by the time duration thereof. However, the portion of trace 30 occupied by a pulse also represents a narrow band of signal frequencies. Consequently the narrower the pulses, the more readily transmissions which are closely adjacent in frequency can be observed. It is therefore apparent that narrower pulses on the display tube will give increased resolution.

Referring now to Fig. 4, the operation of a panoramic receiver in accordance with the invention is illustrated. The R-F band and sweep repetition frequency are assumed to be the same as in Fig. 2. The I-F band is considerably wider and accordingly the frequency range of the local oscillator sweep 34 is somewhat greater.

Due to the wider I-F band, the intermediate sweep frequency 35 corresponding to the highest R-F frequency 21 remains within the I-F pass band for a longer time than in Fig. 2, as shown at 36. However, the dispersive network 16 (Fig. 1) compresses the resulting pulse to a much shorter pulse, as shown at 37. Similarly, the intermediate sweep frequency 38 corresponding to the lowest R-F frequency 21' produces a pulse in the I-F channel whose duration is represented by line 39, and the corresponding output of the dispersive network is a much shorter pulse as shown at 41.

Figure 5:
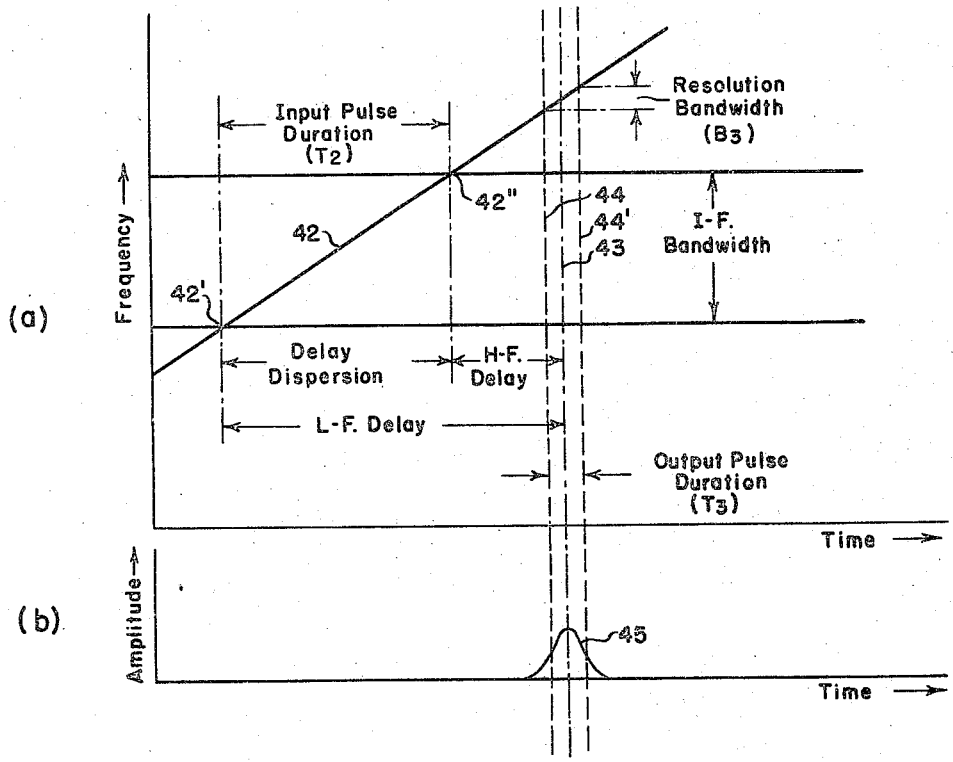
Fig. 5 is a graph presentation for explaining the functioning of the dispersive network in apparatus of the invention.

Fig. 5 shows the operation of the dispersive network in more detail. Here an intermediate sweep frequency signal is shown by line 42. For convenience of illustration this is selected to correspond to an R-F signal somewhat above the lowest R-F frequency. The signal remains within the I-F band for an interval $T_2$, and during this interval the frequency is increasing linearly with time. In the dispersive network the low frequencies are delayed more than the high frequencies. Thus, the lowest frequency 42' is delayed more than the highest frequency 42". The difference between the low and high frequency delays is termed the "delay dispersion."

By matching the dispersion in the dispersive net-work to the sweep rate of the signal 42, all frequency components within the interval $T_2$ arrive substantially simultaneously at the output of the dispersive network, as indicated by the center line 43. That is, knowing the slope of the sweep beat frequency 42, the dispersive network is designed so that each frequency within the I-F pass band is delayed by the proper amount to cause all frequencies to issue from the dispersive network substantially simultaneously.

Actually in practice, the output pulse from the dispersive network cannot have an infinitesimally short duration. Even with a perfect dispersive network, the minimum duration of the output pulse is limited by the bandwith of the circuits preceding the dispersive network. Assuming that the I-F bandwidth is the limiting bandwidth factor, as is commonly the case, the duration $T_3$ of the output pulse will be approximately the reciprocal of the I-F bandwidth, and this is indicated by lines 44, 44'. The sweep rate and the I-F bandwidth determine the length $T_2$ of the input pulse to the dispersive network. The ratio between the input and output pulses is termed the "compression factor."

By referring the output pulse duration $T_3$ back to the sweep rate, the corresponding resolution bandwidth can be obtained, as shown in Fig. 5. This resolution bandwidth is narrower than the I-F bandwidth by the compression factor.

Dispersive networks become very complex and require great care in design and construction in order to approach the ideal. In the present case, the dispersive network may be designed for a compression factor determined in accordance with the above considerations, and further refinement is not commonly necessary.

The output pulse from the dispersive network is detected and displayed, resulting in a pulse on the display such as shown at 45. The relative dimensions shown in Fig. 5 correspond to a rather low compression factor, to facilitate illustration. However, with a compression factor of, say, 100, the duration of pulse 45 would be approximately one-hundredth of the initial pulse duration $T_2$. Hence, a substantial increase in resolution can be obtained. Since the output of the dispersive network is a very short pulse, subsequent circuits including second detector 17, display device 18 and any amplifier employed therebetween, should be designed with adequate bandwidth to reproduce the narrower pulses.

Equations can be derived which show the interrelationship of the various factors so that the advantages of the present invention are more readily apparent. Such equations will be shown below to facilitate more complete understanding of the invention, it being understood that they are approximate to some extent and subject to further elaboration if required. Some of the quantities involved have been described before but are set forth again for convenience. Let:

$B_1$=swept frequency band
$B_2$=I-F bandwidth
$B_3$=resolution bandwidth
$T_1$=sweep repetition period
$T_2$=duration of pulse into dispersive network
$T_3$=duration of pulse out of dispersive network
$F=T_2/T_3$=compression factor
$f_1=1/T_1$=sweep repetition frequency
$\dot{f}$=sweep rate (e.g. megacycles/second/microsecond)

Then, as will be apparent from the foregoing:

$$\dot{f}=B_1/T_1=B_2/T_2=B_3/T_3 \qquad (1)$$

Since the duration of the pulse out of the dispersive network is commonly limited by the I-F bandwidth, to a first approximation:

$$T_3=\frac{1}{B_2} \qquad (2)$$

From the definition of F and Equation 1 we obtain:

$$F=T_2/T_3=B_2/B_3 \qquad (3)$$

From Equations 1 and 2 we obtain:

$$\dot{f}=B_3/T_3=B_2B_3 \qquad (4)$$

With the aid of Equations 1, 3 and 4, and the definition of $f_1$, the following can be derived:

$$B_3=\sqrt{\dot{f}/F}=\sqrt{B_1/T_1F}=\sqrt{B_1f_1/F} \qquad (5)$$

By the use of the same equations, the following can also be derived:

$$B_2=\sqrt{\dot{f}F}=\sqrt{B_1F/T_1}=\sqrt{B_1f_1F} \qquad (6)$$

Equations 5 and 6 are helpful to determine the resolution bandwidth $B_3$ and the I-F bandwidth $B_2$, for a given sweep rate $\dot{f}$ and compression factor F. Since the sweep rate depends upon the swept band $B_1$ and sweep repetition frequency $f_1$, the equations are in these terms also. It is readily apparent that the resolution bandwidth $B_3$ decreases as the compression factor increases, since the square root of F appears in the denominator of Equation 5. As will be understood, a decrease in resolution bandwidth corresponds to increased resolution as the term is commonly used, since more closely adjacent frequencies can be separated. It is also seen from Equation 6 that the I-F bandwidth $B_2$ increases as the square root of the compression factor F, for a given sweep rate.

It should be noted that even though the I-F bandwidth $B_2$ is increased, the sensitivity of the receiver due to noise limitation is not decreased. This is because the noise bandwidth is determined by the resolution bandwidth $B_3$ which is decreased as the compression factor is increased. With appropriate selection of design parameters, greater sensitivity can be obtained.

Equation 5 can be rearranged as:

$$f_1=FB_3^2/B_1$$

Equation 7 shows the effect on sweep repetition frequency if the resolution is held constant. Thus, for a given resolution bandwidth $B_3$ and a given swept band $B_1$, the sweep repetition frequency $f_1$ varies directly with the compression factor F.

Numerical examples may be given to illustrate the advantages of the panoramic receiver of the invention. Suppose it is desired to sweep a band 1000 megacycles wide and secure one megacycle resolution. With a compression factor of 100, Equation 7 shows that a sweep repetition frequency of 100 kilocycles can be employed. Without the dispersive network, the sweep repetition frequency would be limited to about one kilocycle.

As another example, assume a 100 megacycle swept band and a 10 kilocycle sweep repetition frequency. With a compression factor of 100, Equation 5 shows that a resolution of 100 kilocycles can be obtained. Without the dispersive network, the resolution would be limited to about one megacycle. Further, since the resolution bandwidth is also the noise bandwidth and is 1/10 that obtainable without the dispersive network, an added sensitivity of about 10 db can be obtained.

Figure 6:
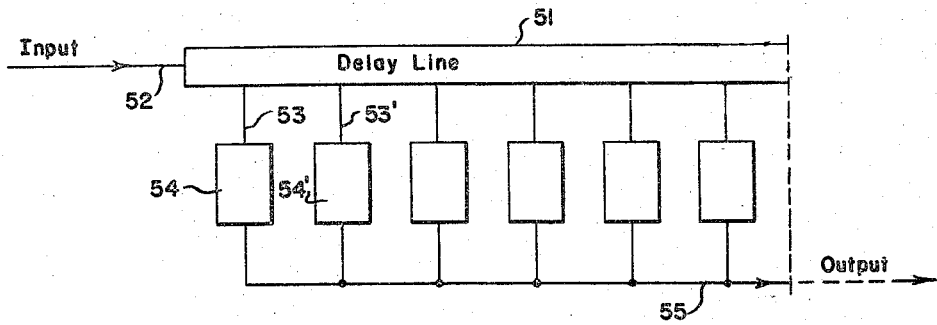
Fig. 6 is a detail of one form of dispersive network.

The dispersive network can be selected to meet the requirements of a given application. A number of types are known and their performance varies in general with the degree of complexity. One form is illustrated in Fig. 6. Here a delay line 51 is fed with an input signal applied at 52, and the line is tapped at a number of successive points 53, 53', etc., corresponding to successively longer delays. Selective filters 54, 54', etc., tuned to pass adjacent narrow frequency bands, are placed in the tapped circuits. The outputs of the filters are connected to a common ouput line 55. To delay low frequencies more than high frequencies, the first filter 54, corresponding to the shortest delay, is designed to pass the highest frequencies in the band, and successive filters pass successively lower frequencies until the entire band is covered. On the other hand, to delay high frequencies more than low, the first filter 54 is designed to pass the lowest frequencies, and successive filters pass successively higher frequencies. To provide a substantially uniformly varying time delay over the entire frequency band to be covered, a large number of taps on the delay line and a large number of filters may be employed. In order to match the dispersive network to the delay dispersion shown in Fig. 5, the taps on the delay line 51 are spaced along the line at the proper intervals to secure the required delay for each narrow range of frequencies in the I-F band.

In the foregoing explanation CW signals have been assumed for convenience of explanation and to develop certain advantages of the invention. However, it will be understood that the panoramic receiver will receive and display pulse transmissions also. As in the case of CW transmissions, the advantages for pulse transmissions will depend on which parameters are changed from those of the conventional receiver. For example, if the receiver of the invention is designed to have substantially the same sweep rate but increased resolution, relatively long received pulses may be considered to be CW signals and increased resolution will be obtained.

The response for short received pulses warrants some additional explanation. Here the frequency spectrum of the transmitted pulses requires consideration. The shorter the pulses, the wider the frequency spectrum, and vice versa. Commonly it is considered that the frequency spectrum has a bandwidth approximately the reciprocal of the pulse length, frequency components lying outside this band being usually of small importance. If a conventional receiver with one magacycle resolution and a sweep rate of one megacycle per microsecond is employed to receive 0.1 microsecond pulses, individual pulses of approximately one microsecond duration will be displayed, since the receiver is incapable of displaying shorter pulses. If the pulsed transmission is not in synchronism with the sweep frequency, successively received pulses will spread over approximately a 10 megacycle region of the display, since the frequency spectrum of a 0.1 microsecond pulse extends over approximately 10 megacycles.

With a receiver in accordance with the invention having, say, a 10 megacycle bandwidth and a compression factor of 100 to give 100 kilocycle resolution, a much larger portion of the pulse spectrum will be received during the reception of each pulse. For example, if the incoming pulse arrives when the sweep is at the center of the I-F band, substantially all the frequency components of the pulse will be received simultaneously. This will be reproduced in a 10 megacycle region of the display. Although the overall width of the display will be similar to that of a conventional receiver, in the present receiver only a single transmission or a small number of transmissions are required to identify the transmission, and there is less danger of ambiguity. Thus a considerable advantage is obtained.

If, instead of employing the invention to increase resolution, it is employed to increase the sweep repetition frequency while maintaining resolution the same, there is much less likelihood of missing brief transmissions. Also, in the case of rapidly recurring pulses more information will be obtained in a shorter time.

In Fig. 1, the dispersive network 16 is shown following the I-F amplifier 15. If desired, the dispersive network can be placed ahead of the I-F amplifier, or between stages of the I-F amplifier, and similar results obtained. That is, in general, the dispersive network and I-F amplifier can be placed in cascade between the mixer and the detector in any desired order.

While the invention is especially important in the field of panoramic receivers, it can also be employed in other types of apparatus employing a sweep frequency heterodye circuit. Examples are audio spectrum analyzers, noise analyzers, etc. When used in an audio spectrum analyzer, the antenna 11 and preselector 12 of Fig. 1 will ordinarily be replaced by an input circuit adapted to the frequency range to be covered. Also, in such applications the beat frequencies obtained from mixer 13 will commonly lie above the input frequencies. It will be apparent from the foregoing that the present invention has distinct advantages in such applications in improving resolution, or in allowing wider swept bands or higher sweep repetition frequencies. In noise analyzers the input circuit and beat frequency range will be adapted to the requirements of the particular application.

The invention has been described in connection with specific embodiments thereof, and a number of variations have been mentioned. It will be understood that the invention has wide applicability, and that the embodiments described can be further elaborated to meet the requirements of a particular application. Although ordinarily a display will be employed capable of human observation, for some applications it may be desired to use the output of the receiver for automatic control and dispense with human observation. In such cases the conventional second detector may be replaced by other detector means capable of developing control signals suited to the intended application.

I claim:

1. A panoramic radio receiver which comprises a radio frequency input circuit for receiving signals, a sweep-frequency oscillator, a heterodyne mixer connected with said input circuit and oscillator for producing beat frequencies between input signals and the oscillator sweep-frequency, an intermediate frequency amplifier for amplifying said beat frequencies, a dispersive network connected in cascade with said amplifier, and detector and utilization means connected with the output of said cascaded amplifier and dispersive network.

2. A panoramic radio receiver which comprises a radio frequency input circuit for receiving signals, a sweep-frequency oscillator, a heterodyne mixer connected with said input circuit and oscillator for producing beat frequencies between input signals and the oscillator sweep-frequency, whereby sweep beat frequencies may be obtained corresponding to respective signal frequencies, an intermediate frequency amplifier for amplifying said beat frequencies, a dispersive network connected in cascade with said amplifier having a delay dispersion substantially matched to the sweep rate of said sweep beat frequencies, and detector and utilization means connected with the output of said cascaded amplifier and dispersive network.

3. A panoramic radio receiver which comprises a radio frequency input circuit for receiving signals, a sweep-frequency oscillator, a heterodyne mixer connected with said input circuit and oscillator for producing beat frequencies between input signals and the oscillator sweep-frequency, whereby sweep beat frequencies may be obtained corresponding to respective input signal frequencies, an intermediate frequency amplifier for amplifying said beat frequencies, a dispersive network connected in cascade with said amplifier having a delay dispersion substantially matched to the sweep rate of said sweep beat frequencies, the bandwidth of said amplifier being correlated with said sweep rate and dispersive network to give a compression factor substantially greater than unity, detector means connected with the output of said cascaded amplifier and dispersive network, and utilization means connected with said detector means and responsive to detected signals corresponding to input signals of different frequency.

4. A panoramic radio receiver which comprises a radio frequency input circuit for receiving signals, an oscillator for producing a sweep frequency of predetermined frequency range and sweep repetition frequency, a heterodyne mixer connected with said input circuit and oscillator for producing beat frequencies between input signals and the oscillator sweep-frequency, whereby sweep beat frequencies may be obtained corresponding to respective signal frequencies, an intermediate frequency amplifier of predetermined bandwidth for amplifying said beat frequencies, a dispersive network connected in cascade with said amplifier having a delay dispersion substantially matched to the sweep rate of said sweep beat frequencies, said dispersive network being adapted to convert a pulse of duration corresponding to said sweep rate and said amplifier bandwidth into a substantially shorter pulse, detector means connected with the output of said cascaded amplifier and dispersive network, and display means connected with said detector means and adapted to separately display detected signals corresponding to input signals of different frequency.

5. A panoramic radio receiver which comprises a radio frequency input circuit for receiving signals, an oscillator for producing a sweep frequency of predetermined frequency range and sweep repetition frequency, a heterodyne mixer connected with said input circuit and oscillator for producing beat frequencies between input signals and the oscillator sweep-frequency, whereby sweep beat frequencies may be obtained corresponding to respective signal frequencies, an intermediate frequency amplifier of predetermined bandwidth for amplifying said beat frequencies, said bandwidth being less than said sweep frequency range whereby a sweep beat frequency passing through said bandwidth produces a pulse of duration corresponding to the sweep rate and said bandwidth, a dispersive network connected in cascade with said amplifier having a delay dispersion substantially matched to said sweep rate and adapted to convert pulses of said duration to substantially shorter pulses, detector means connected with the output of said cascaded amplifier and dispersive network, and display means connected with said detector means and adapted to separately display detected signals corresponding to input signals of different frequency.

6. A panoramic radio receiver which comprises a radio frequency input circuit for receiving signals, an oscillator for producing a sweep frequency of predetermined frequency range and sweep repetition frequency, a heterodyne mixer connected with said input circuit and oscillator for producing beat frequencies between input signals and the oscillator sweep-frequency, whereby sweep beat frequencies may be obtained corresponding to respective signal frequencies, an intermediate frequency amplifier of predetermined bandwidth for amplifying said beat frequencies, said bandwidth being less than said sweep frequency range whereby a sweep beat frequency passing through said bandwidth produces a pulse of duration corresponding to the sweep rate and said bandwidth, a dispersive network connected in cascade with said amplifier having a delay dispersion substantially matched to said sweep rate and adapted to convert pulses of said duration to corresponding pulses of substantially shorter duration, detector means connected with the output of said cascaded amplifier and dispersive network, and display means connected with said detector means and adapted to separately display detected signals corresponding to input signals of different frequency, the bandwidths of said amplifier, detector means and display means being substantially at least as great as the reciprocal of said shorter duration.

7. A sweep-frequency heterodyne circuit which comprises an input circuit for receiving signals, a sweep-frequency oscillator, a heterodyne mixer connected with said input circuit and oscillator for producing beat frequencies between input signals and the oscillator sweep-frequency, an amplifier for amplifying said beat frequencies, a dispersive network connected in cascade with said amplifier, and detector means connected with the output of said cascaded amplifier and dispersive network.

8. A sweep-frequency heterodyne circuit which comprises an input circuit for receiving signals, a sweep-frequency oscillator, a heterodyne mixer connected with said input circuit and oscillator for producing beat frequencies between input signals and the oscillator sweep-frequency, whereby sweep beat frequencies may be obtained corresponding to respective signal frequencies, an amplifier for amplifying said beat frequencies, a dispersive network connected in cascade with said amplifier having a delay dispersion substantially matched to the sweep rate of said sweep beat frequencies, and detector means connected with the output of said cascaded amplifier and dispersive network.

9. A sweep frequency heterodyne circuit which comprises an input circuit for receiving signals, an oscillator for producing a sweep frequency of predetermined frequency range and sweep repetition frequency, a heterodyne mixer connected with said input circuit and oscillator for producing beat frequencies between input signals and the oscillator sweep-frequency, whereby sweep beat frequencies may be obtained corresponding to respective signal frequencies, an amplifier of predetermined bandwidth for amplifying said beat frequencies, a dispersive network connected in cascade with said amplifier having a delay dispersion substantially matched to the sweep rate of said sweep beat frequencies, said dispersive network being adapted to convert a pulse of duration corresponding to said sweep rate and said amplifier bandwidth into a substantially shorter pulse, detector means connected with the output of said cascaded amplifier and dispersive network, and display means connected with said detector means and adapted to separately display detected signals corresponding to input signals of different frequency.

10. A sweep-frequency heterodyne circuit which comprises an input circuit for receiving signals, an oscillator for producing a sweep frequency of predetermined frequency range and sweep repetition frequency, a heterodyne mixer connected with said input circuit and oscillator for producing beat frequencies between input signals and the oscillator sweep-frequency, whereby sweep beat frequencies may be obtained corresponding to respective signal frequencies, an amplifier of predetermined bandwidth for amplifying said beat frequencies, said bandwidth being less than said sweep frequency range whereby a sweep beat frequency passing through said bandwidth produces a pulse of duration corresponding to the sweep rate and said bandwidth, a dispersive network connected in cascade with said amplifier having a delay dispersion substantially matched to said sweep rate and adapted to convert pulses of said duration to substantially shorter pulses, detector means connected with the output of said cascaded amplifier and dispersive network, and display means connected with said detector means and adapted to separately display detected signals corresponding to input signals of different frequency.

11. A sweep-frequency heterodyne circuit which comprises an input circuit for receiving signals, an oscillator for producing a sweep frequency of predetermined frequency range and sweep repetition frequency, a heterodyne mixer connected with said input circuit and oscillator for producing beat frequencies between input signals and the oscillator sweep-frequency, whereby sweep beat frequencies may be obtained corresponding to respective signal frequencies, an amplifier of predetermined bandwidth for amplifying said beat frequencies, said bandwidth being less than said sweep frequency range whereby a sweep beat frequency passing through said bandwidth produces a pulse of duration corresponding to the sweep rate and said bandwidth, a dispersive network connected in cascade with said amplifier having a delay dispersion substantially matched to said sweep rate and adapted to convert pulses of said duration to corresponding pulses of substantially shorter duration, detector means connected with the output of said cascaded amplifier and dispersive network, and display means connected with said detector means and adapted to separately display detected signals corresponding to input signals of different frequency, the bandwidths of said amplifier, detector means and display means being substantially at least as great as the reciprocal of said shorter duration.

No references cited.